Figure 1:
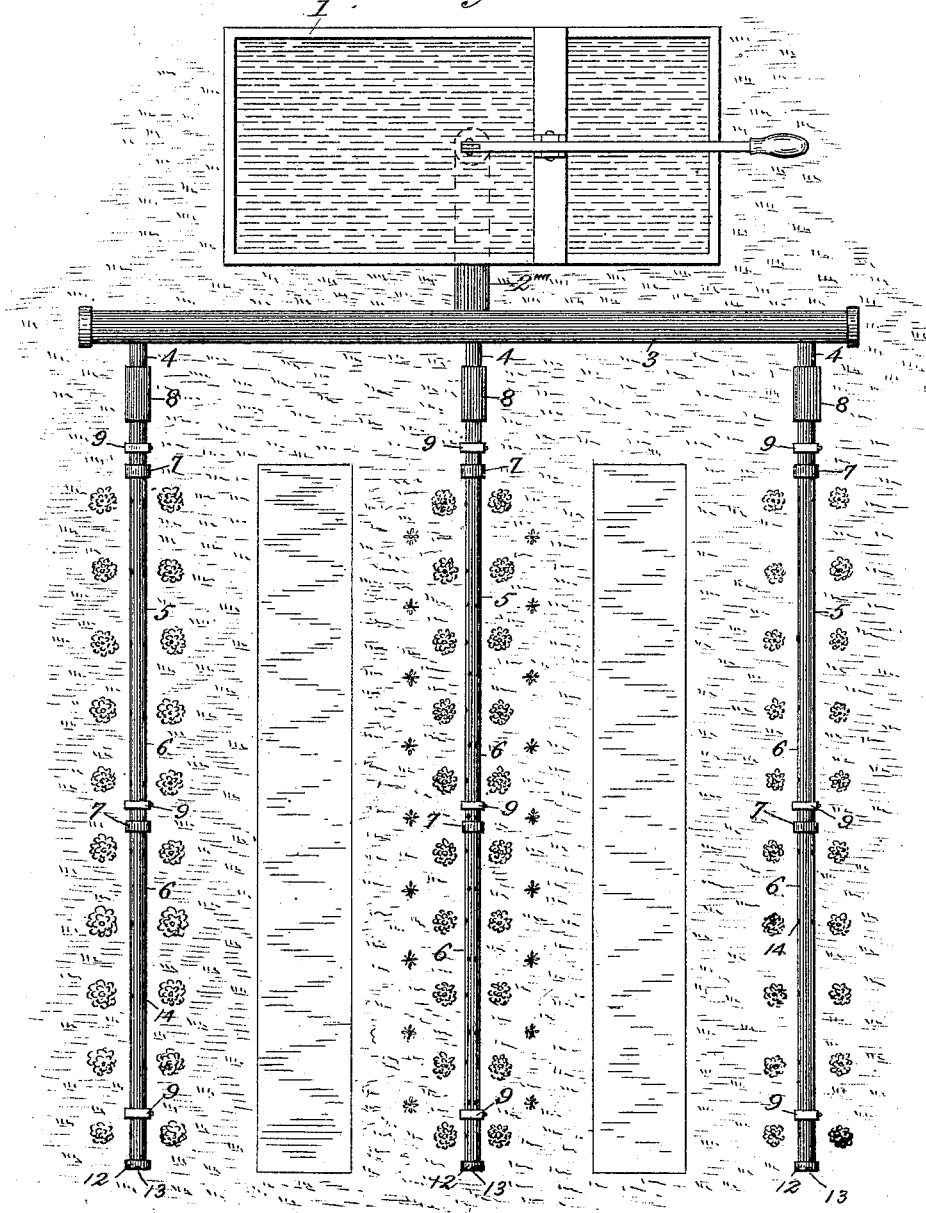

(No Model.) 2 Sheets—Sheet 1.

J. WALTER.
SPRINKLING OR IRRIGATING APPARATUS.

No. 395,726. Patented Jan. 8, 1889.

Witnesses:
T. R. Stuart
Parker ...

Inventor:
John Walter,
By Marble + Mason,
Attys.

(No Model.) 2 Sheets—Sheet 2.
J. WALTER.
SPRINKLING OR IRRIGATING APPARATUS.
No. 395,726. Patented Jan. 8, 1889.
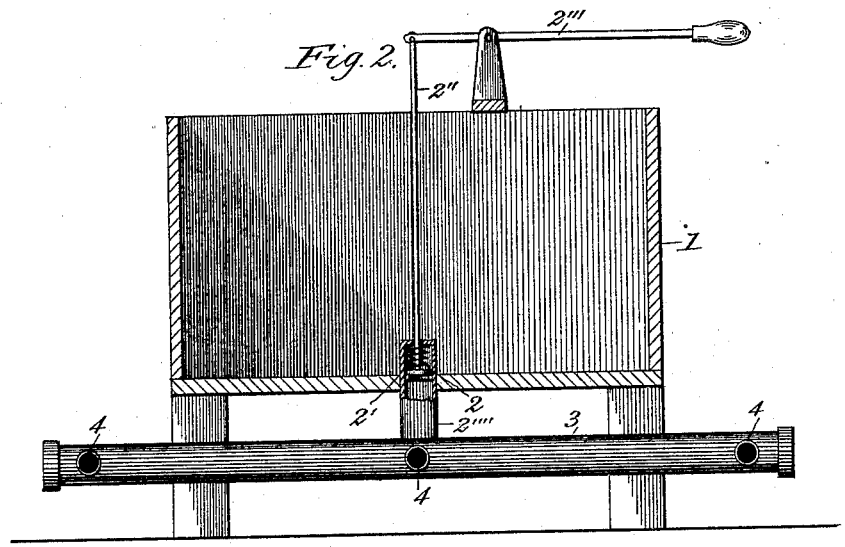
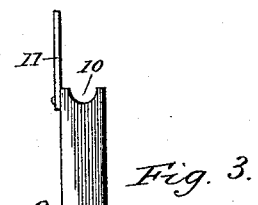
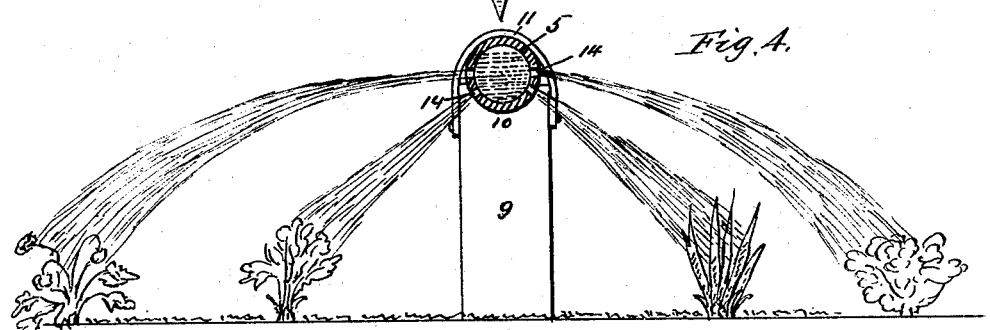
Witnesses:
T. R. Stuart
Parker...
Inventor:
John Walter,
By
Marble + Mason,
Att'ys.

UNITED STATES PATENT OFFICE.

JOHN WALTER, OF WINTER HAVEN, FLORIDA.

SPRINKLING OR IRRIGATING APPARATUS.

SPECIFICATION forming part of Letters Patent No. 395,726, dated January 8, 1889.

Application filed February 9, 1888. Serial No. 263,452. (No model.)

*To all whom it may concern:*

Be it known that I, JOHN WALTER, a citizen of the United States, residing at Winter Haven, in the county of Polk and State of Florida, have invented certain new and useful Improvements in Sprinkling or Irrigating Apparatus; and I do hereby declare the following to be a full, clear, and exact description of the invention, such as will enable others skilled in the art to which it appertains to make and use the same.

My invention relates to that class of apparatus for sprinkling or irrigating vegetables or plants in which perforated pipes receiving their water-supply from a suitable reservoir, tank, or hydrant are employed and supported above the ground and the vegetables or plants to be sprinkled or irrigated; and it consists in the improved construction and arrangement or combination of parts hereinafter disclosed in the description, drawings, and claims.

The principal object of my invention is to provide an improved apparatus of the character named, in which perforated sectional branch pipes may be moved or slid longitudinally, so as to direct the water-jets issuing from the perforations upon one set or row of plants, and thereupon by sliding said pipes longitudinally to change said jets to another row of plants arranged, for instance, in the spaces between the plants of the first row, whereby two or four rows of plants may be sprinkled, as desired.

A further object of my invention is to dispense with the underground systems of irrigation which are now mainly in use and carried out by expensive iron piping and fittings, and also to do away with the liability of the perforations in underground pipes being filled with roots, fibers, &c., and to substitute for such systems one which is removable, portable, and adjustable—one in which the sectional branch pipes can be readily and quickly uncoupled and, with their supports or stakes, removed to another place or stored away for future use.

The invention is illustrated in the accompanying drawings, forming part of this specification, wherein the same reference-numerals indicate the same parts, and in which—

Figure 1 represents a plan view of the apparatus with the branch pipes applied, respectively, to two and four rows of plants; Fig. 2, a vertical longitudinal section of the tank or reservoir, showing the valve in the bottom thereof, the devices for operating said valve, and the outlet-pipe connected to the main pipe; Fig. 3, an elevation of one of the pipe-supporting stakes and its bail or strap, and Fig. 4 a transverse section of a branch pipe for sprinkling four rows of plants or vegetables.

In the drawings, the numeral 1 indicates a reservoir or tank provided with a valve, 2, fitted in an opening in its bottom. On top of this valve is placed and suitably secured a spiral spring, 2', which surrounds the lower end of a rod, 2'', which is secured to said valve, passed upwardly and out of the tank, and pivoted to a hand-lever, 2'''. Beneath the valve 2 and the opening in the bottom of the tank is secured an outlet-pipe, 2'''', through which the water from the tank or reservoir is admitted into the main pipe 3, which is placed transversely at the ends of the rows or beds of vegetables or plants, and has a short outlet-pipe, 4, projecting laterally from it at the end of each row or bed of plants. The reservoir or tank, however, may be dispensed with, and the main pipe may be directly connected to a hydrant or other convenient water-supply source; also, said main pipe may be of any desired length and located above or under ground.

The branch pipes 5 are composed of lengths or sections 6 of perforated pipe connected by screw-joints 7, and are so attached to the outlet-pipes 4 of the main pipe that their inner ends form sliding connections or joints 8, which permit them to be moved longitudinally.

The sectional branch pipes 5 are preferably formed from sheet metal or wood, so as to be cheap and easily portable. They are supported above the ground, in the spaces between the rows of vegetables or plants, upon stakes 9, which are formed with round notches or recesses 10 in their upper ends for the reception of said branch pipes. These stakes are provided with bails or straps 11, which are secured to their sides and adapted to be passed over the pipes and fastened. These straps not only secure the pipes in the notches or recesses of the stakes, but permit of said pipes being slid or moved longitudinally therethrough.

The ends of the branch pipes may be closed by suitable caps or plugs, 12, having each a small aperture, 13, at or near its under side, so that when the ground is inclined the water may drain out at the ends of said pipes after the sprinkling is finished. These sectional branch pipes also have perforations 14 in their sides near their lower portions, which are opposite or register with the plants in the rows beneath and at both sides of said pipes, the perforations being so placed that the jets of water issuing from them will strike directly upon the plants in said rows.

In the drawings are shown three sectional branch pipes, the two outer pipes supplying water to only two rows of plants, while the middle pipe supplies water to four rows, as it has two rows of perforations in its sides at or near its center and two rows near its lower portion, the perforations of the two sets of rows being alternated in position. By arranging the perforations in this manner those in the sides of the pipe sprinkle the plants in the two outer or farther rows, while the perforations in its lower portion sprinkle the two inner or nearer rows, as shown in Fig. 4 of the drawings, in which the jets of water from the two differently-arranged sets of rows of perforations are shown issuing upon the four rows of plants.

By having the inner ends of the sectional branch pipes attached to the main pipe by the sliding joints or connections above named the pipe-sections may be slid longitudinally in their supports or stakes in such a manner that the jets may be thrown either between the plants or directly upon them, the plants being planted at the same relative distances apart as the perforations formed in the pipes. For instance, when the apparatus is used for sprinkling strawberry and similar plants or vegetables, the young plants, which are usually between the older ones, may be sprinkled by simply sliding the pipes so as to bring the jets to bear upon them after the older plants have been sprinkled.

My improved apparatus may also be employed for assisting in setting rows of plants for being subsequently sprinkled thereby. To this end the ground is first properly prepared; then the notched stakes are set in the locations desired; then the branch pipes are attached to the main pipe and secured to said stakes; then a supply of water is admitted to said branch pipes, which jets out through the perforations in their sides and forms wet spots upon the ground, which indicate the places for setting the plants, and then the usual planting-sticks are thrust into said wet spots to form holes in which to insert the plants. All this is done in a very few minutes, and yet provision is made for an arrangement of the plants in direct alignment with the perforations in the sides of the pipes, so that the jets of water from said perforations can be discharged directly upon said plants as long as desired, and subsequently directed between said plants by merely adjusting or sliding the pipes longitudinally.

The pipe-sections may be easily removed whenever it is desired to plow or cultivate between the rows of plants; also, the stakes may be removed and inserted and the pipe-sections connected in a comparatively short space of time, the entire apparatus being light, portable, simple of construction, and easily applied and operated.

I am aware that it is old in a system of irrigation to employ a series of open troughs which overlap and underlap, and which are respectively provided with closed and open ends, and with open-top spouts leading to another series of laterally-arranged troughs, which are provided with perforations near their tops; but I am not aware that these devices are either the same in structure as my main pipe, perforated branch pipes and their belongings, or that they permit of the same ease of connection, removal, or adjustment for the purposes herein explained; also, I am aware that irrigating-pipes formed with a lapped joint at one side of each, and with notches in the inner edge of said lapped joint have been used in connection with an open trough for delivering water thereto, and I do not claim the same, as they have neither the structure nor capabilities of operation of my main pipe and branch pipes, as herein described and claimed; also, I am aware that the spring-controlled valve in the supply-tank employed by me is not of my invention, and I do not claim the same separately; but,

Having thus fully described my invention, what I claim as new is—

1. In a sprinkling or irrigating apparatus, the combination, with a main pipe having outlet-pipes arranged at the ends of the beds or rows of plants to be watered, of branch pipes which are formed with perforations in both sides and movably or slidingly connected to said outlet-pipes and supported above said plants, substantially as and for the purpose described.

2. In a sprinkling or irrigating apparatus, the combination, with a main pipe, of a sectional longitudinally-movable branch pipe formed with perforations in both sides and provided with a cap having a drainage-aperture in its lower portion, substantially as described.

3. In a sprinkling or irrigating apparatus, the combination of a water-supply source, a main pipe provided with outlet-pipes at the ends of the beds or rows of plants to be watered, sectional branch pipes which are connected by screw-joints and formed with rows of perforations registering with said beds or rows of plants and constructed to be longitudinally movable upon said outlet-pipes, and supports or stakes formed with notches or recesses in which said branch pipes may be slid longitudinally, substantially as and for the purpose described.

4. In a sprinkling or irrigating apparatus, the combination of the main pipe 3, having the outlet-pipes 4 opposite the ends of the rows or beds of plants, with the perforated branch pipes 5, having movable or sliding joints 8 at their inner ends, and caps 12, having apertures 13 at their outer or lower ends, substantially as and for the purpose described.

5. The herein-described sprinkling or irrigating apparatus, comprising a supply-tank provided with a discharge-opening, a valve, a spring for holding said valve closed, a rod and hand-lever for opening the same and an outlet-pipe, a main water-supply pipe having outlet-pipes, perforated branch pipes telescoping or slidingly-connected to said outlet-pipes and formed in removable sections, and notched or recessed supporting-stakes provided with bails or straps, substantially as described.

In testimony whereof I affix my signature in presence of two witnesses.

JOHN WALTER.

Witnesses:
A. B. HARRINGTON,
C. A. JOYCE.